(12) United States Patent
Sarnoff

(10) Patent No.: US 7,971,522 B2
(45) Date of Patent: Jul. 5, 2011

(54) GRILL LINER

(75) Inventor: Norton Sarnoff, Northbrook, IL (US)

(73) Assignee: Handi-Foil Corporation, Wheeling, IL (US)

( * ) Notice: Subject to any disclaimer, the term of this patent is extended or adjusted under 35 U.S.C. 154(b) by 675 days.

(21) Appl. No.: 12/047,656

(22) Filed: Mar. 13, 2008

(65) Prior Publication Data

US 2009/0229477 A1 Sep. 17, 2009

(51) Int. Cl.
*A47J 37/07* (2006.01)
*A47J 27/00* (2006.01)

(52) U.S. Cl. ............... 99/400; 99/401; 99/444; 99/446; 99/447; 99/450

(58) Field of Classification Search .................... 99/400, 99/401, 444, 445, 446, 447, 450; 126/25 R
See application file for complete search history.

(56) References Cited

U.S. PATENT DOCUMENTS

| | | | | |
|---|---|---|---|---|
| 3,555,994 A | * | 1/1971 | Nemetz et al. | 99/444 |
| 3,717,083 A | * | 2/1973 | Karapetian | 99/450 |
| 4,909,395 A | * | 3/1990 | Weissman | 229/208 |
| 4,969,449 A | * | 11/1990 | Levin | 126/332 |
| 4,979,440 A | * | 12/1990 | Latour et al. | 99/445 |
| 5,586,491 A | * | 12/1996 | Diller et al. | 99/450 |
| 6,718,866 B1 | * | 4/2004 | Robinson | 99/445 |
| 6,994,017 B2 | * | 2/2006 | Lerner | 99/376 |

* cited by examiner

*Primary Examiner* — Reginald L Alexander
(74) *Attorney, Agent, or Firm* — Adam Sacharoff; Much Shelist

(57) ABSTRACT

In summary there is provided in one embodiment a grill liner for placement on top of a cooking grate and used to cook food placed thereon. The grill liner includes a plurality of holes to help allow heat to move through the grill liner. The grill liner further includes at least one flap that is secured to a portion of the grill liner through a frangible bridge, point, or line of weakness. The frangible bridge when broken permits the flap to bend downwardly. The grill liner when placed on the cooking grate may then have its one or more flaps bent downwardly through bars such that the grill liner movement across the cooking grate can be limited.

12 Claims, 4 Drawing Sheets

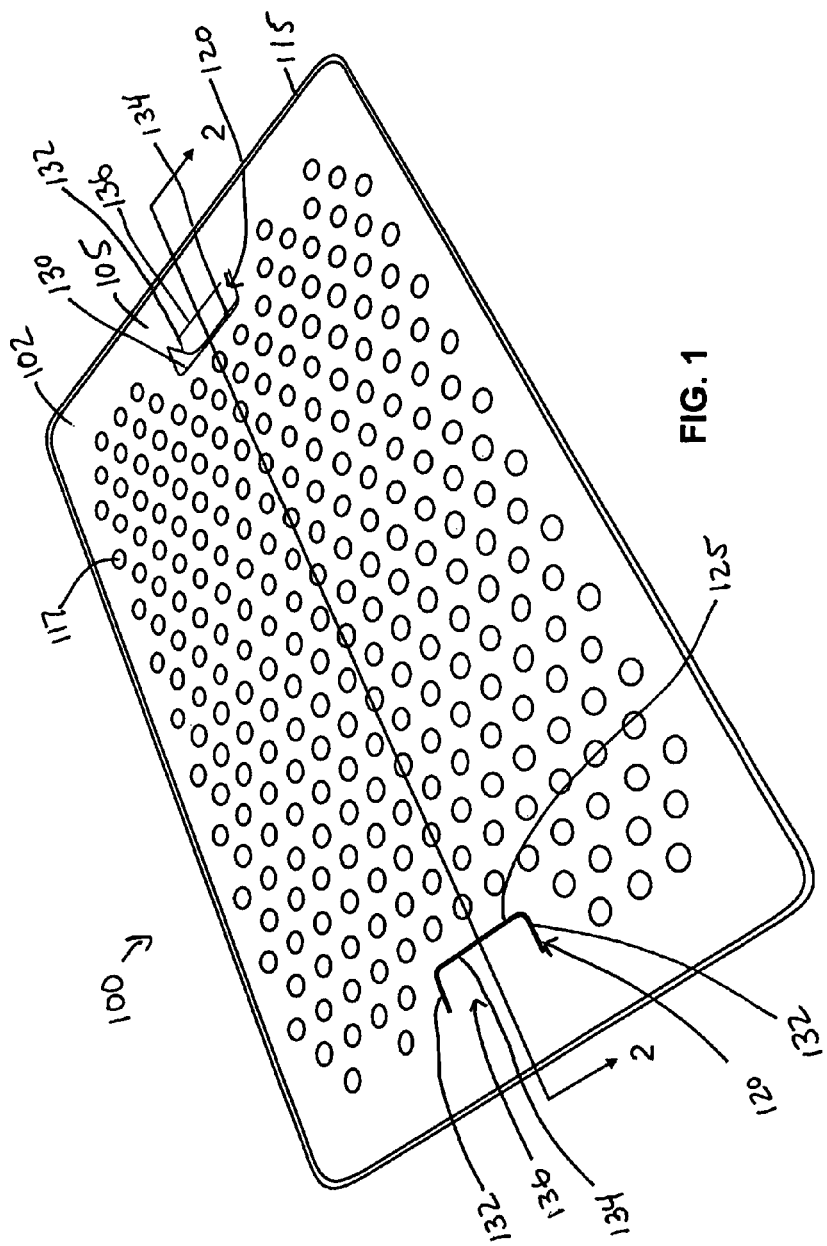
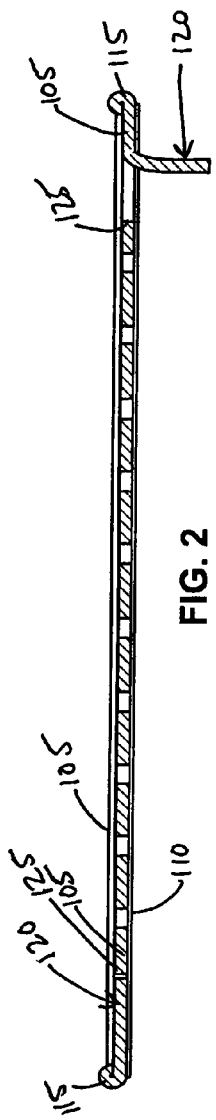
FIG. 1
FIG. 2

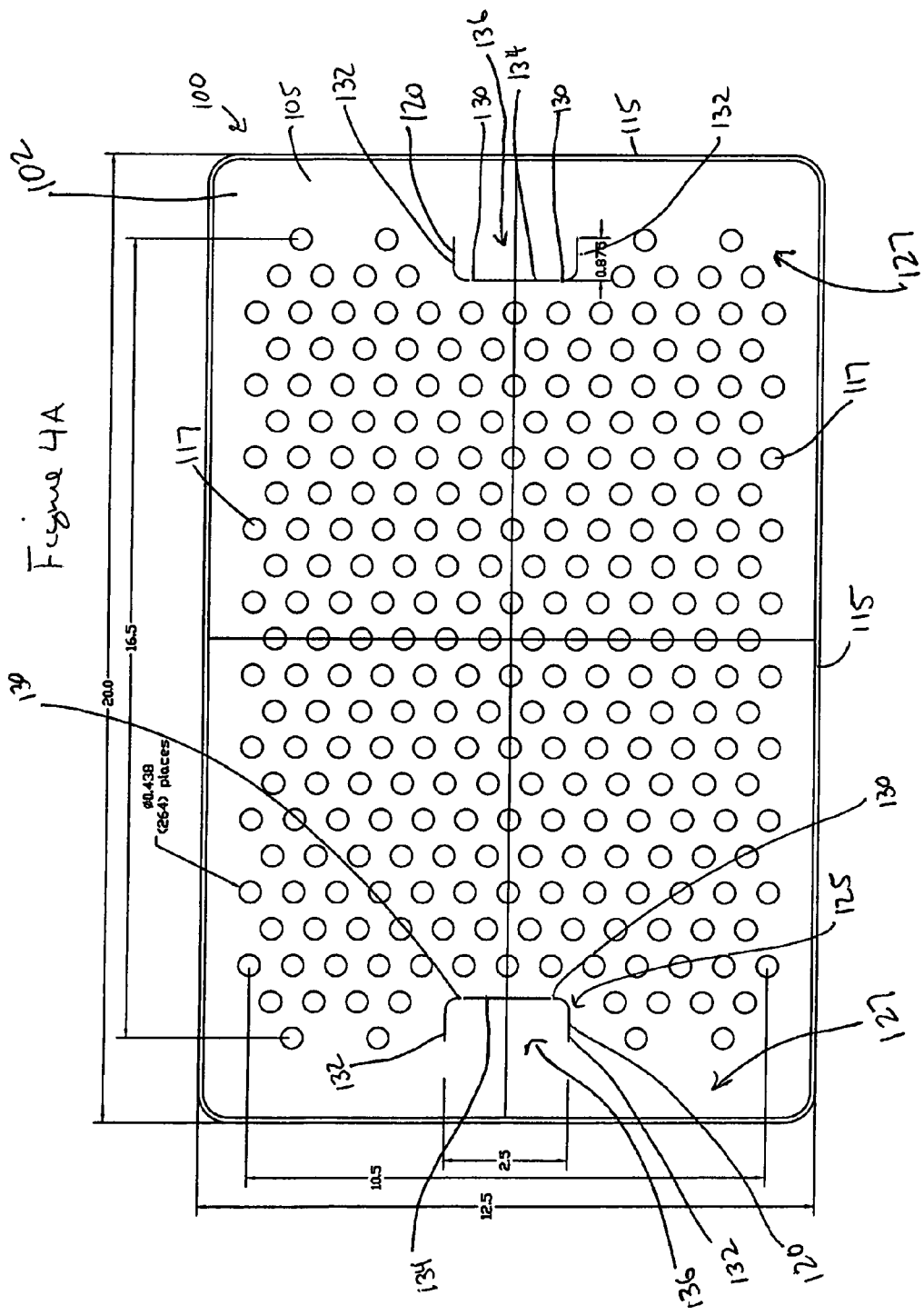

GRILL LINER

FIELD OF THE INVENTION

The present invention relates to grills and more particularly to a food supporting liner for a barbeque.

BACKGROUND OF THE INVENTION

Food supporting pans, baskets, racks, otherwise referred to herein generally as grilling pans, have long been used to cook food on grills and barbeques. The grilling pans are typically used to help keep the food from falling through the top supporting cooking grates or protect the food from burning. As well defined, cooking grates are usually made up of cross bars set about an inch apart from one another and traverse the entire cooking region the barbeque or grill. While the grilling pans are helpful, there is a continuing need to improve upon the prior art grilling pans.

SUMMARY OF THE INVENTION

In accordance with the present invention there is provided in one embodiment a grill liner for placement on top of a cooking grate and used to cook food placed thereon. The grill liner is a substantially flat disposable liner that may take on any shape that is deemed appropriate. The grill liner includes a plurality of holes to help allow heat from the heating region to move through the grill liner. The grill liner further includes at least one flap that is secured to a portion of the grill liner through a frangible point or line of weakness. The frangible point of weakness when broken permits the flap to bend downwardly. The grill liner when placed on the cooking grate may then have its one or more flaps bent downwardly through the cross bars such that the grill liner movement across the cooking grate can be limited.

In an embodiment of the invention, there is provided a grill liner for use with a cooking grate. The cooking grate typically includes a plurality of bars. The grill liner would include a body having a top region for the placement of a food item and a bottom region for placement on the cooking grate. At least one bendable flap section is secured to the body by at least one frangible bridge. The bendable flap section includes a lateral edge with two sides extending from the lateral edge. When the at least one frangible bridge is connecting the bendable flap section to the body, the grill liner has a substantially planar bottom region. When the at least one frangible bridge is broken, the bendable flap section may be bent and positioned between two bars of the plurality of bars to limit movement of the grill liner while on the cooking grate.

In addition, the bendable flap section may include a bendable region opposite the lateral edge to help promote the bending action. The grill liner may include a pair of bendable flap sections diametrically opposed near ends defined on the grill liner.

Additionally, the grill liner may include a plurality of holes positioned through the body to help facilitate cooking or heat displacement. Lastly, the body may include a roll over bead positioned about a perimeter defined by the body.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 1 is a perspective view of a grill liner in accordance with an embodiment of the present invention FIG. 2 is a cross-sectional view of the grill liner of FIG. 1 taken at section line 2-2;

FIG. 4A is a top view of a grill liner in accordance with another embodiment; and FIG. 4B is a side view the grill liner from FIG. 4A.

DETAILED DESCRIPTION OF THE EMBODIMENTS

Figure 3A:
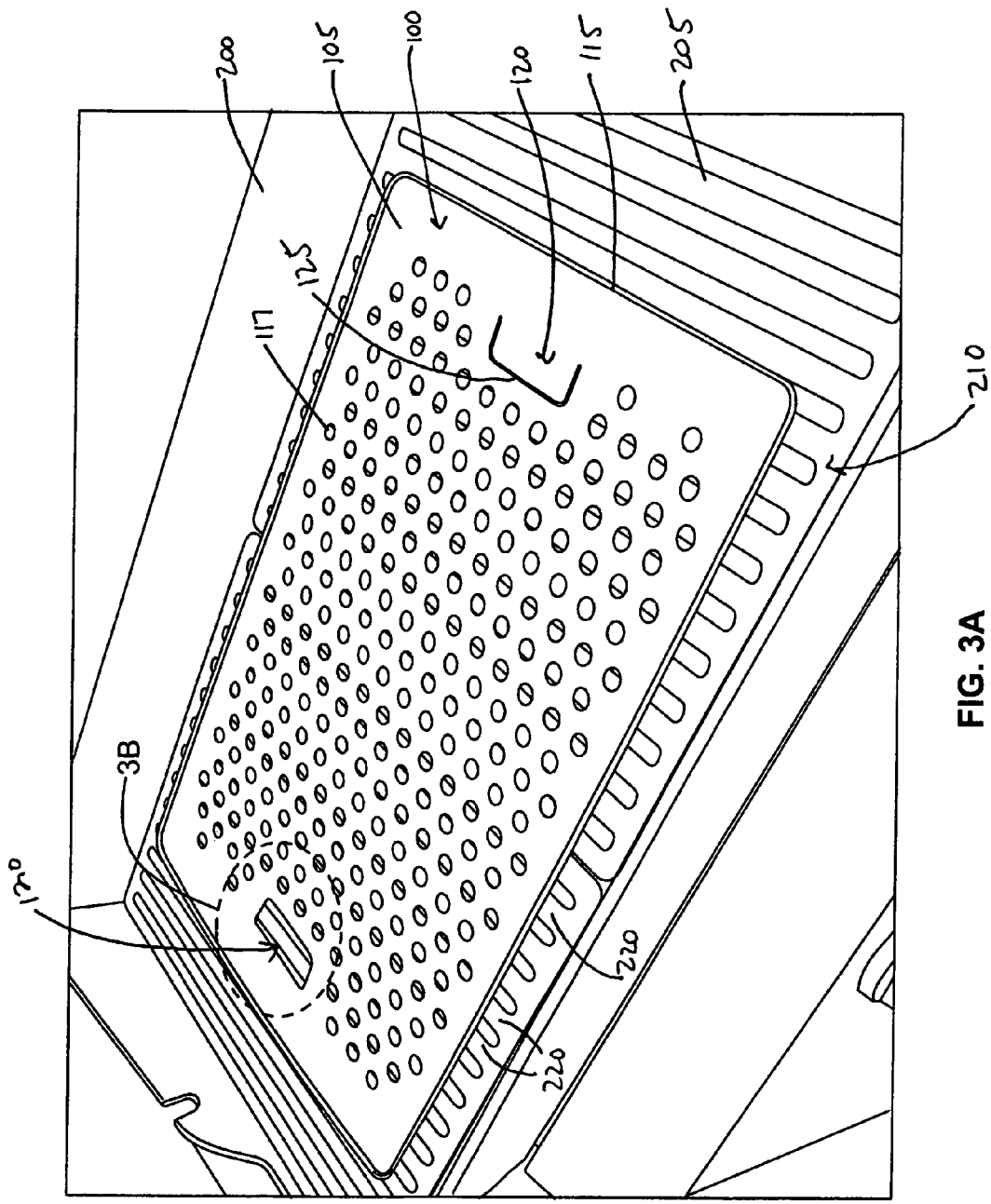
FIG. 3A is a perspective view of the grill liner of FIG. 1 placed on a grill.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 3B:
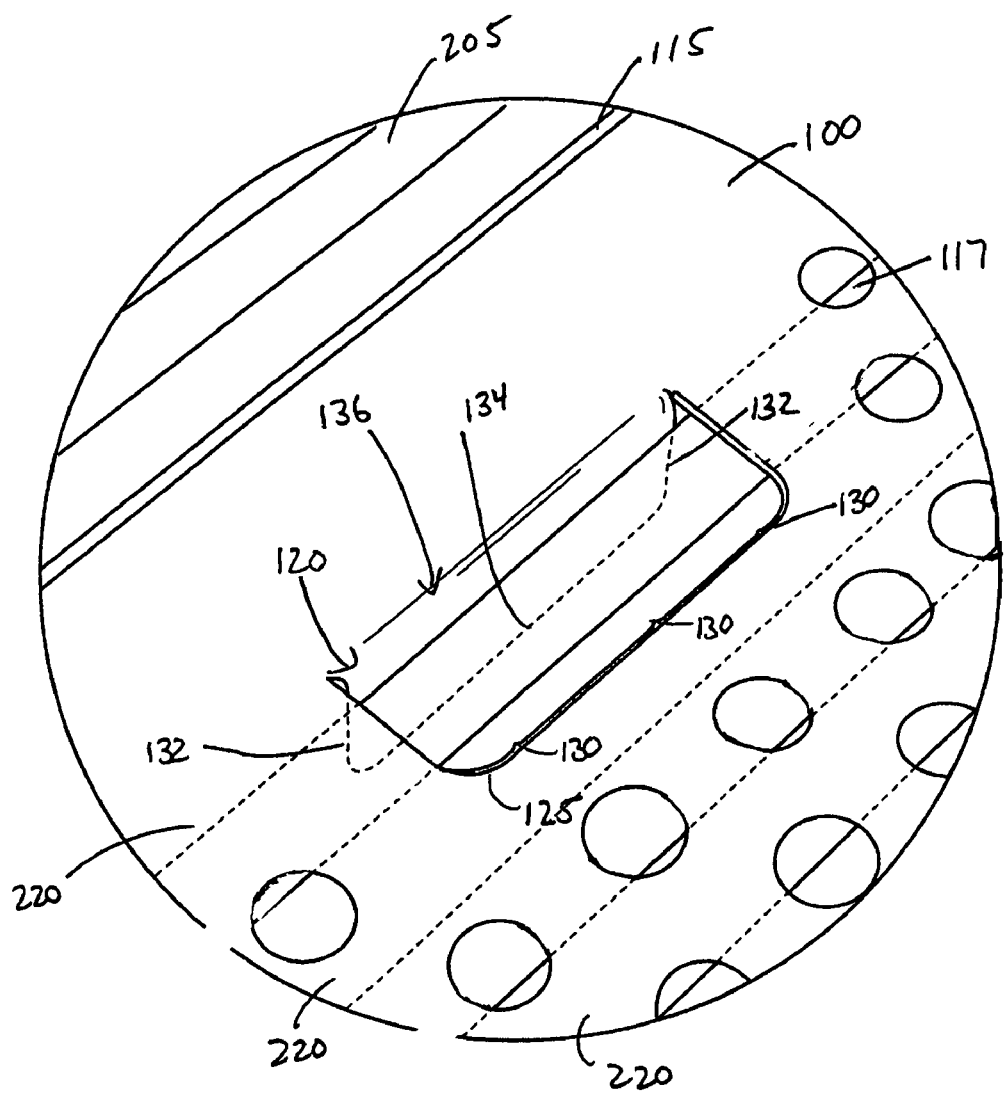
FIG. 3B is an enlarged view of section 3B of FIG. 3A.

With reference to FIGS. 1 through 3B, there is shown in one embodiment a grill liner 100 used for coking food in a grill or barbeque. The grill liner 100 includes a body 102 having a top region 105 and a bottom region 110. The bottom region 110 would be placed on top of a cooking grate 205 over the cooking region 210 in the grill or barbeque 200. The grill liner 100 is illustrated as having a rectangular shape; however, the shape of the grill liner 100 can easily be changed without affecting the scope of the invention. The grill liner 100 also includes an outer rim that includes a roll over bead 115. The roll over bead 115 helps protect the user from sharp edges that may occur during the formation of the grill liner 100. A plurality of holes 117 are positioned about the grill liner 100.

The grill liner 100 further includes at least one bendable flap section 120 that is secured to a portion 125 of the grill liner 100. The portion 125 may be positioned near an end 127 of the body 102. The flap section 120 is attached to the portion 125 through one or more frangible bridges 130. The frangible bridges 130 once broken will allow the flap section to bend downwardly. In addition, it is also within the scope to provide a frangible line of weakness between the flap section 120 and the portion 125. The flap section 120 in one variation includes a pair of sides 132 and a lateral edge 134 connecting the sides 132. A bendable side 136 opposing the lateral edge 134 permits the flap section 120 to move when separated from the portion 125 of the grill liner 100.

The grill liner 100 is also preferably made of aluminum and preferably disposable. When the grill liner 100 is made of light weight aluminum, the thickness of the grill liner 100 is such that permits the flap to bend easily with the user simply applying pressure to the flap. However, the grill liner 100 may be of a more durable form of aluminum and may include a formed bendable side that allows the user to easily bend the flap without much pressure.

During use, the grill liner 100 may be placed on top of the cooking grate 205 with the one or more flaps 120 separated from its respective portion 125 of the gill liner. The flaps 120 would be bent downwardly through the bars 220 of the cooking grate 205 and may rest against the bars. In this position, the grill liner 100 would be limited movement on top of the cooking grate and would allow food placed thereon to be easily cooked without having to worry about the food falling through the cooking grate.

As further illustrated in FIGS. 4a and 4b, in one embodiment the grill liner 100 may have a length between 15 and 25 inches and preferably of about 20 inches. The width may be about 10 to 15 inches and preferably of about 12.5 includes. The flap sections would be positioned about 2 inches from the edge of the liner and have sides of about 0.75 to 1 inch in length or preferably about 0.875 inches. The lateral edge between the sides of the flap may be between 2 to 3 inches in length or preferably about 2.5 inches.

The liner may also be used in an oven or used with any type of cooking grate or rack that includes a number of parallel or evenly spaced bars.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A grill liner for use with a cooking grate, the cooking grate having a plurality of bars, the liner comprising:
   a body having a periphery, a top region and a bottom region, wherein the top region is for the placement of a food item and the bottom region is for placement on a cooking grate, the top region and bottom region having a co-terminis with said periphery of the body; and
   at least one bendable flap section secured to the body by at least one frangible bridge, the bendable flap section includes a lateral edge with two sides extending from the lateral edge,
   the grill liner having a first substantially flat configuration defined by having the bendable flap section connected to the body by the at least one frangible bridge, such that an entirety of the bottom region defined by the periphery of the body, and not a portion thereof, is substantially planar, and the grill liner having a second configuration defined when the at least one frangible bridge is broken and the at least one bendable flap section is bent downwardly, whereby when the grill liner is in the second configuration and positioned on the cooking grate such that the at least one bendable flap section is positioned between two bars of the plurality of bars movement of the grill liner on the cooking grate is restricted.

2. The grill liner of claim 1, wherein the at least one bendable flap section includes a bendable region opposite the lateral edge.

3. The grill liner of claim 1, wherein the at least one bendable flap section is further defined as a pair of bendable flap sections diametrically opposed near ends defined on the grill liner.

4. The grill liner of claim 1, wherein the body has a plurality of holes positioned there-through.

5. The grill liner of claim 1, wherein the body includes a roll over bead positioned about the periphery.

6. A grill liner for use with a cooking grate, the cooking grate having a plurality of bars, the liner comprising:
   a body having a periphery, the periphery having there-between a top region for the placement of a food item and a bottom region for placement on a cooking grate;
   at least one bendable flap section secured to the body by at least one frangible bridge, the bendable flap section includes a lateral edge with two sides extending from the lateral edge, the grill liner having a first substantially flat configuration defined by the bendable flap section being connected to the body by the at least one frangible bridge, such that an entirety of the bottom region defined by the periphery of the body and not a portion thereof, is substantially planar, and the grill liner having a second configuration defined when the at least one frangible bridge is broken and the at least one bendable flap section is bent downwardly, whereby when the grill liner is in the second configuration and positioned on the cooking grate such that the at least one bendable flap section is positioned between two bars of the plurality of bars movement of the grill liner on the cooking grate is restricted; and
   a roll over bead positioned about the periphery.

7. The grill liner of claim 6, wherein the at least one bendable flap section includes a bendable region opposite the lateral edge.

8. The grill liner of claim 6, wherein the at least one bendable flap section is further defined as a pair of bendable flap sections diametrically opposed near ends defined on the grill liner.

9. The grill liner of claim 6 wherein the body has a plurality of holes positioned there-through.

10. A grill liner for use with a cooking grate, the cooking grate having a plurality of bars, the liner comprising:
    a body having a periphery, the periphery having there-between a top region for the placement of a food item and a bottom region for placement on a cooking grate;
    at least one bendable flap section secured to the body by at least one frangible bridge, the bendable flap section includes a lateral edge with two sides extending from the lateral edge, the grill liner having a first substantially flat configuration defined when the bendable flap section is connected to the body by the at least one frangible bridge, such that an entirety of the bottom region defined by the periphery of the body, and not a portion thereof, is substantially planar, and the grill liner having a second configuration defined when the at least one frangible bridge is broken and the at least one bendable flap section is bent downwardly, whereby when the grill liner is in the second configuration and positioned on the cooking grate such that the at least one bendable flap section is positioned between two bars of the plurality of bars movement of the grill liner on the cooking grate is restricted;
    a roll over bead positioned about the periphery; and
    said body having a plurality of holes positioned there-through.

11. The grill liner of claim 10, wherein the at least one bendable flap section includes a bendable region opposite the lateral edge.

12. The grill liner of claim 10, wherein the at least one bendable flap section is further defined as a pair of bendable flap sections diametrically opposed near ends defined on the grill liner.

* * * * *